V. A. STASER.
AUTOMOBILE.
APPLICATION FILED DEC. 18, 1914.
1,192,240.
Patented July 25, 1916.
5 SHEETS—SHEET 1.
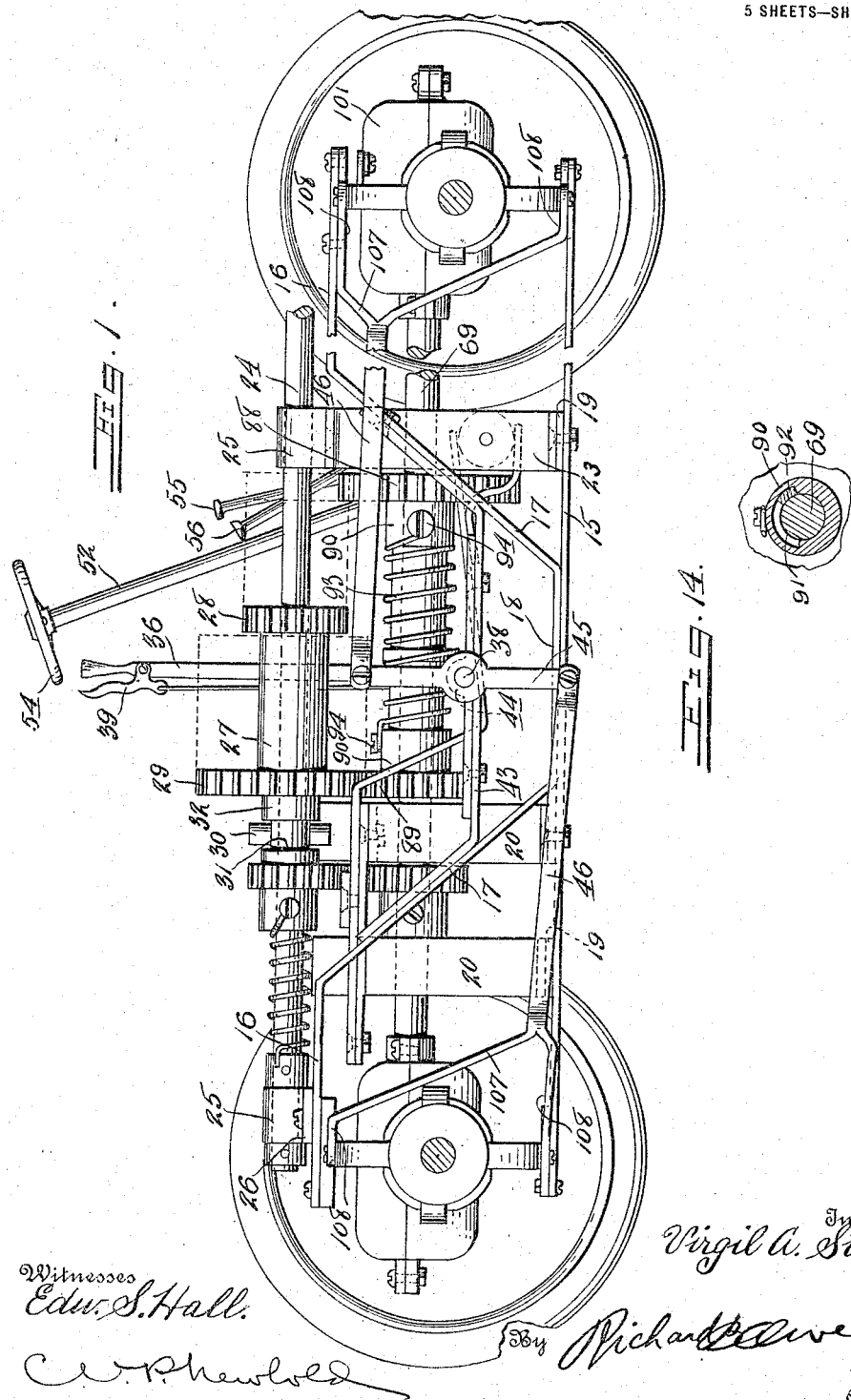
Witnesses
Edw. S. Hall.
C. P. Newbold
Inventor
Virgil A. Staser
By Richard B. Owen.
Attorney

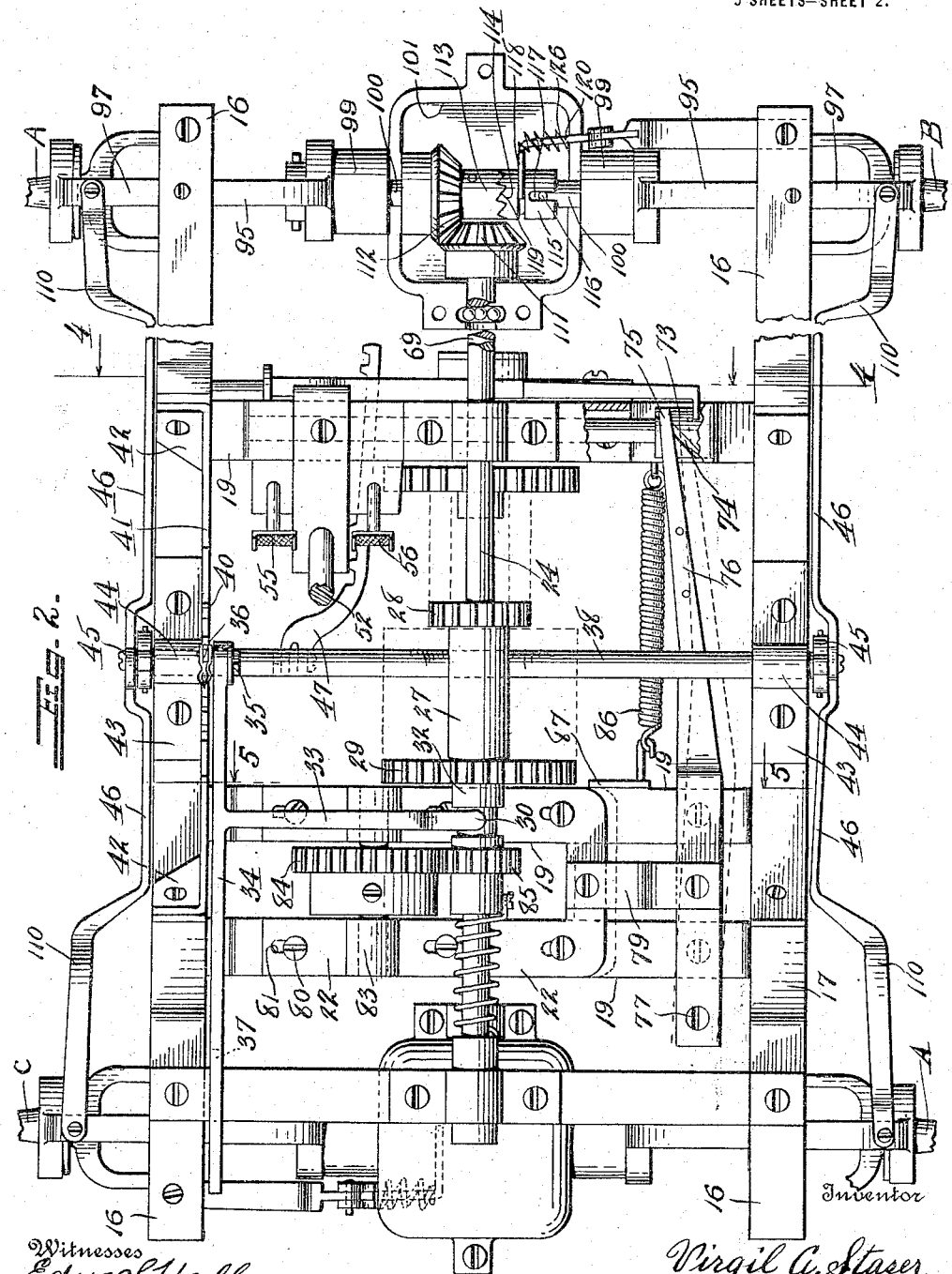

V. A. STASER.
AUTOMOBILE.
APPLICATION FILED DEC. 18, 1914.
1,192,240.
Patented July 25, 1916.
5 SHEETS—SHEET 3.
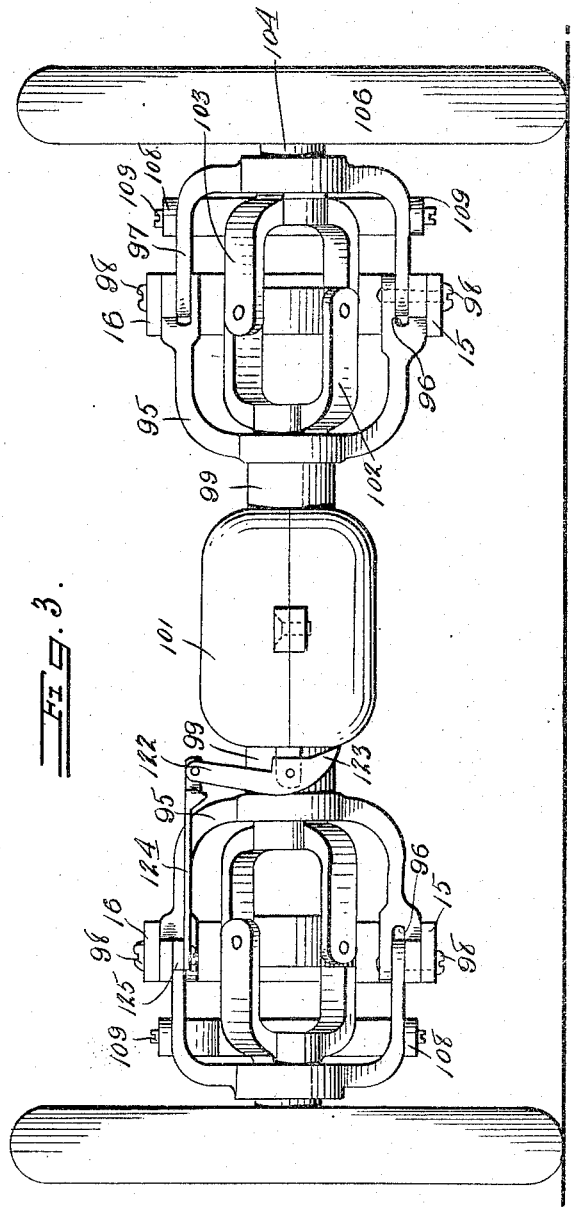
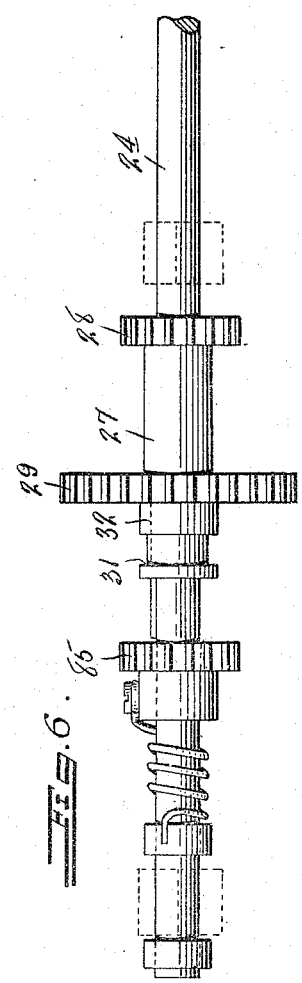
Witnesses
Edw. S. Hall.
Inventor
Virgil A. Staser
By Richard B. Owen
Attorney

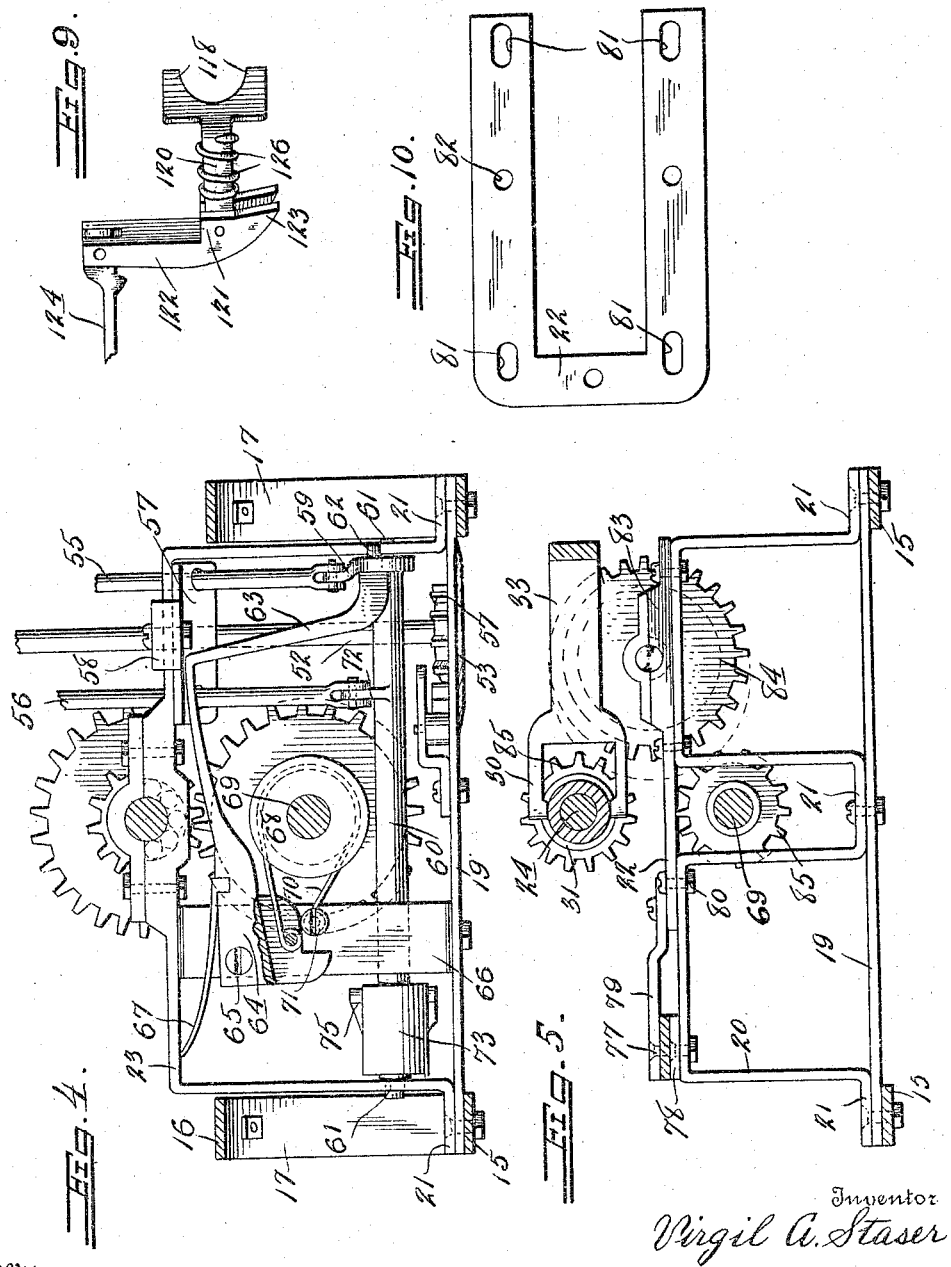

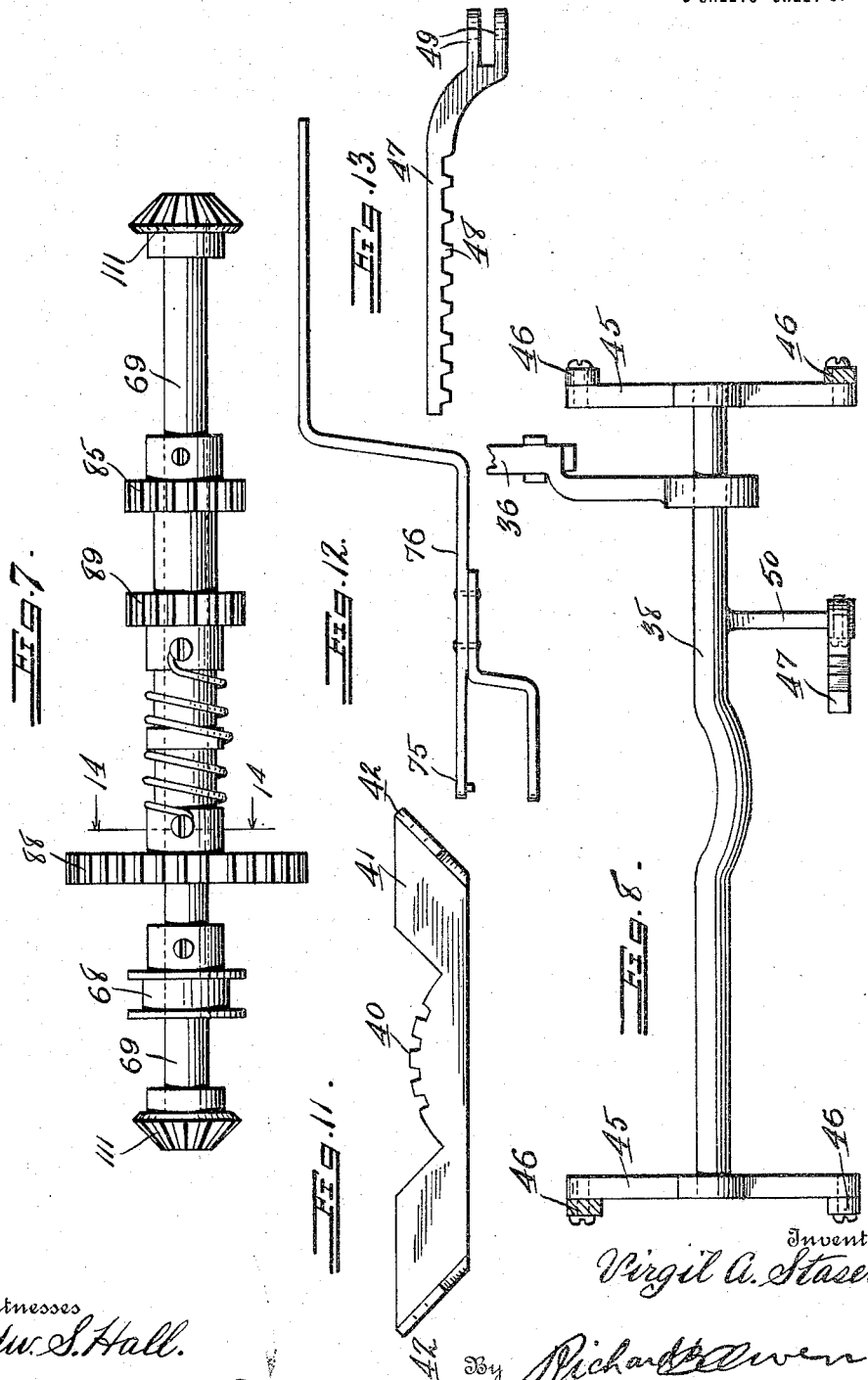

UNITED STATES PATENT OFFICE.

VIRGIL A. STASER, OF CLEARWATER, FLORIDA.

AUTOMOBILE.

1,192,240.   Specification of Letters Patent.   Patented July 25, 1916.

Application filed December 18, 1914. Serial No. 877,923.

*To all whom it may concern:*

Be it known that I, VIRGIL A. STASER, a citizen of the United States, residing at Clearwater, in the county of Pinellas and State of Florida, have invented certain new and useful Improvements in Automobiles, of which the following is a specification.

This invention relates to the construction of vehicles such as are provided with their own means of locomotion, vehicles of this type being commonly termed automobiles.

As a principal object, it is contemplated by this invention to provide an automobile construction which may be differentiated from the ordinary and well known types in the truss formation of the chassis; in the arrangement of the power and driven shafts; in the braking mechanism as attached to the driven shaft and not to the wheels and in the four-wheel drive and steering mechanism.

The above and additional objects of a more specific nature, which may become apparent as this explanatory description proceeds are accomplished by such means as are illustrated in the accompanying drawings, described in the following specification, and then more particularly pointed out in the claims which are appended hereto and form a part of this application.

With reference to the drawings, wherein there is illustrated the preferred embodiment of this invention as it is reduced to practice, and throughout the several views of which like characters of reference designate similar parts:—Figure 1 is a side elevational view of the chassis, running gear and driving equipment of an automobile as constructed in accordance with the tenets of this invention, a portion of the front and rear axles being broken away, Fig. 2 is a plan view of the matter shown in Fig. 1, with the wheels removed, Fig. 3 is an end elevation of the same subject-matter, Fig. 4 is a sectional view taken upon the line 4—4 of Fig. 2, Fig. 5 is a similar view taken on the line 5—5 of Fig. 2, Fig. 6 is an individual elevation of the power shaft, Fig. 7 is a similar view of the driven shaft, Fig. 8 is a view of the transverse steering shaft, Fig. 9 is a detail in perspective of the differential clutch control, Fig. 10 is an individual plan of the sliding reversing plate, Fig. 11 is a side view of the control lever plate, Fig. 12 is a view in side elevation of the reversing lever operating in conjunction with the plate of Fig. 10, Fig. 13 is a view in plan of the steering rack for insuring control of the shaft shown in Fig. 8, and Fig. 14 is a sectional view taken on the line 14—14 of Figs. 1 and 7 showing the means obviating the danger of stripping the intermeshing gears when changing speed or when starting the machine.

In accomplishing the objects of this invention and in regard to the construction of automobiles there is illustrated in the drawings and particularly in Figs. 1 and 2 a truss chassis frame including a lower elongated steel plate 15, vertically superimposed over which and parallel to which at its extremities is the similar plate 16 formed with intermediate downwardly inclined portions 17 which are connected by the integral lower plate 18 adapted to rest upon the mentioned lower plate 15 and at its central point.

A structure as above described comprises the side of the chassis frame, a pair of such structures being horizontally alined and connected by suitable cross knees 19 of a similar plate like shape, two of which cross knees are provided between the transverse center and the rear of the chassis, one of such knees being positioned near the forward portion of the said chassis. Secured upon these rearmost cross knees 19 are the supporting frames designated as a whole by the numeral 20 of Fig. 5 of a shape analogous to the knees in cross section and provided with terminal and intermediate flanges 21 by means of which they are secured to their respective knees. The portions of these supports connecting each terminal flange with the intermediate base flange are bent upwardly in the shape of an angular and inverted U as is clearly shown in this figure, the bight portion of these U's being alined to form supporting surfaces for the horizontally slidable plate 22 illustrated in plan in Fig. 10 as will be hereinafter more fully described.

The forward cross knee 19 carries a supporting plate of inverted angular U-shape as denoted by the numeral 23 being similarly provided with the terminal flanges 21 but being spaced from the knee 19 a distance equal to the vertical spacing between the extremities of the side truss plates 15 and 16 in order to commonly support the power shaft 24 in suitable bearings 25 with the cross plate 26 connecting the rear extremities of the side trusses 16. This power shaft or crank shaft 24 is driven at its forward extremity by any suitable source of motive power such as the internal combustion type of motor most generally used upon automobiles, although not so illustrated in connection with this invention. Between the cross plate 26 and the forward support 23 there is splined upon this shaft the sleeve 27 carrying the driving gears 28 and 29 at either extremity, the former being the low speed and the latter the high speed of the automobile. Movement of this sleeve is controlled by the action of the bifurcated fingers 30 operating within a suitable groove 31 formed in an extension collar 32 secured to the sleeve 27 on the opposite side of the large gear 29, such bifurcated fingers being carried at the extremity of an arm 33 which projects laterally from the control bar 34, one end of which is secured as at 35 to the hand lever 36 and the other end of which is bifurcated as at 37 to slidably embrace the rear cross plate 26.

The lever 36 mentioned as the manually controllable element in determining the meshing of the driving gears 28 and 29 is loosely mounted as shown in Fig. 8 upon the transverse steering arm 38 being equipped with a suitable spring actuated locking mechanism 39 which operates upon the rack 40 shown in Fig. 11 as being formed integral with the plate 41, the ends of which are angularly flanged as indicated at 42 in order that such plate may be supported upon the inclined portion 17 of the adjacent chassis truss member. It should be noted that these mentioned chassis members may also be reinforced by plates 43, the ends of which are angularly upturned to lie upon the inclined portion 17. These bracing portions 43 also support suitable bearings 44 in which is journaled the extremities of the mentioned steering shaft 38, such extremities being prolonged to support the integral double arms 45 normally occupying the vertical position illustrated in Figs. 1 and 8, and bearing at their outer ends the oppositely directed steering means 46 the connection of which will be hereinafter more completely set forth. Rotation of the steering shaft is accomplished by means of the rack 47 which is illustrated in Fig. 13 having the customary teeth 48 and being formed with an offset and bifurcated portion 49 attachable to an arm 50 depending from the steering shaft 38 and adjacent the central portion thereof. This rack is adapted to mesh with the spur gear 51 which is carried on the lower extremity of the steering shaft 52 and rests upon the forward cross knee 19 which has the portion 53 bent to lie in the plane of the spur gear 51 in order to form a secure bearing therefor. The steering rod 52 is projected upwardly and provided with a suitable hand wheel 54 of any ordinary style and is situated in the vicinity of the control lever 36 in order that the operator of the automobile will have the control means convenient for his use.

Further controlling means concerned respectively with the braking and reversing mechanism are to be actuated by means of the braking pedal 55 and the reversing pedal 56 respectively as particularly illustrated in Figs. 4 and 5. These pedals project through a suitable plate 57 on either side of the steering rod 52 which is provided with a separate support 58, the braking pedal operating upon one extremity of a bell crank lever 59 which is loosely mounted on a cross shaft 60 the ends of which are journaled in the frame support 23 as indicated by the numeral 61. The opposite end of this bell crank has loosely mounted therein the reduced extremity 62 of a substantially L-shaped lever 63 formed with the enlarged head portion 64 which is pivotally mounted at the point 65 to the vertical brace 66 spanning the distance between the forward cross knee 19 and the frame support 23. A leaf spring or other resilient means 67 may be carried by this lever 63 for contact with the support 23 in normally maintaining the brake lever in the position illustrated in Fig. 4, and assuring return to the normal position of the pedal 55 after its depression by the operator. A braking drum 68 is secured upon the driven shaft 69 and provides the usual channeled way for the brake strap 70 one end of which is secured as at 71 to the fixed standard 66 and the other end of which is fastened to the enlarged lever head 64 at a point offset from the pivot 65 thereof so that a tightening of the braking band will result, obviously, upon a depression of the pedal 55.

The reversing mechanism is operated upon by depression of the pedal 56 which causes a partial rotation of the shaft 60 through the medium of the arm extension 72, such shaft bearing adjacent one extremity the fixed sleeve 73 which is grooved as indicated in Fig. 2 by the numeral 74, such groove being repeated upon the upper and lower sides of the sleeve to accommodate the fingers 75 formed at the end of the reverse lever 76 which is pivoted at the point 77 to a suitable extension 78 carried by the rearmost support 20 so that a movement of the reversing plate 22 is accomplished through the medium of the link 79, such plates being mounted upon the two portions of each support by any suitable fastening means 80 extending through the slots 81 which afford a transverse sliding movement to the plates and also serving to limit such movement. Through apertures 82 formed in the reversing plate pass suitable securing means for a bearing 83 upon which is mounted the reversing gear 84 being adapted to be interposed between similarly sized and vertically alined gears 85 respectively carried upon the power shaft 24 and the transmission shaft 69. The engagement of the gear 84 with both of these smaller gears is indicated in dotted lines in Fig. 5. The coiled contractile spring 86 has one end secured to the shaft 60 and the other to a plate 87 carried on the foremost support 19 of the rearward pair, this spring normally tending to resist the rotation of the shaft 60 necessary to introduce the reversing gear between the transmission gears 85 and thus assure the return of the reversing lever 56 to its original position upon release.

Transmission is effected between the sliding gears 28 and 29 of the power shaft 24 and the driven shaft 69 by means of gears 88 and 89 mounted upon the latter and designed to mesh with the first mentioned gears respectively. Each of these driven gears is mounted upon the shaft 69 in the manner illustrated in Fig. 14 being provided with the sleeve 90 in which there is formed the substantially semi-circular recess 91 contiguous to the shaft 69 and adapted to accommodate therein the lug 92 which is carried by said shaft in such manner that the sleeve will have at least a quarter turn of independent rotation before becoming engaged with the lug to induce rotation of the shaft. The gear sleeves being thus mounted are connected by the coil spring 93 which surrounds the shaft and has its opposite ends secured in either gear sleeve by suitable fastening means 94. The primary gears of transmission 28 and 29 are slid upon the shaft by means of the control lever 33, the limits of such movement being indicated by the dotted oblongs in Fig. 1 so that either of the gears may mesh with its respective gear of the secondary transmission set or both gears may occupy a central neutral position. This resilient arrangement enables all of the shock of immediate contact between either pair of these transmission gears to be absorbed before the inertia of the driven shaft is encountered thus avoiding all liability of stripping the gears. The transmission of the power to the wheels of the vehicle will be more clearly set forth following the description now to be undertaken of such wheels and of their manner of mounting.

Since it is expected that all four wheels of the vehicle be driven and steered, it is necessary that both the forward and rear axles be of the divided and semi-floating type and be constructed exactly alike so that the specific description may be restricted to either axle as illustrated in Fig. 3. In this figure the spaced truss members 15 and 16 accommodate vertically between each other the U-shaped cage denoted as a whole by the numeral 95 having each of its extremities bifurcated as as 96 in order to accommodate in such bifurcations the similar but slightly smaller cage 97, suitable securing means 98 passing, at once, through the bifurcated extremities of the first mentioned cage, the inserted extremities of the second cage and the adjacent truss member, the second cage being thus pivotally mounted with respect to the first and the chassis of the car. The larger cages 95 are sleeved as indicated at 99 upon their respective half axles 100, the inner ends of these axles entering and supporting the differential casing 101 while the outer ends emerging from the sleeves 99, carry the U-shaped member 102 of a universal joint which further includes the similar member 103 carried by the hub portion 104 which extends through the smaller cages 97, such U-members having their ends secured at the opposite ends of respectively perpendicular diameters of a connecting disk 105 whereby transmission of power is assured between the half axles 100 and the hub portions 104 regardless of the angle made by the plane of each wheel 106 carried by the hub portion, with the axis of the machine.

The steering rods 46 previously described as being connected in oppositely disposed pairs with the double arms 45 on each side of the vehicle are projected forwardly and rearwardly from such arms in the manner illustrated in Fig. 1 being formed at their outer extremities with the elongated bifurcation 107 terminating in the horizontal portions 108 which are pivoted as at 109 to the adjacent smaller cage 97, such bifurcations and parallel portions of these rods being laterally offset as indicated by the numeral 110 of Fig. 2. Since these steering rods act upon the smaller cages 97 at a point removed from their pivots 98 it will be apparent that either a forward or rearward movement of these rods will result in a turning of the respective wheels 106 about the vertical axes of the aforesaid pivots 98, it being also apparent that upon any turning movement of the machine that each pair of front and rear wheels upon either side will be oppositely turned due to the fact that the double arm construction of the steering link 45 turns the adjacent edges of the wheels of its pair either simultaneously toward or away from itself, such adjacent edges being the rearward edge for the front wheel and the forward edge for the rear wheel causing the machine to make but two tracks in rounding a curve after the manner of railway rolling stock under similar conditions.

Turning to the description of the differential, there will now be disclosed the means permitting all four wheels to be thus driven and steered since it is evident that since the wheels have various turning movements that some shiftable mechanism preferably automatic must be provided to accommodate the rotation of the "outside" wheels relatively to that of the "pivoting" wheels. This is done as is illustrated particularly in Fig. 2 in which the beveled gears 111 are carried at the opposite ends of the shaft 69 which enters the differential casing upon suitable antifrictional means shown in Fig. 2, these gears serving to drive the similar gears 112 which are carried by the half axles 100 of the forward left wheel and the rearward right wheel which are the only two constantly and positively driven wheels of the machine being denoted by the characters A for the sake of speedy reference. The gear sleeves 113 of these bevels 112 are formed with the rosette or clutch faces 114 with which there is adapted to mate the similar clutch face formed upon the slidable sleeve 115 which is splined upon each axially alined half axle 100 by means of the pin 116 and the slot 117 formed in the sleeve. An automatic control for this slidable clutch is illustrated in perspective in Fig. 9 including the clutch fingers 118 adapted to coact with the clutch groove 119, such fingers being mounted angularly upon the arm 120 which is received in the bifurcated extremity 121 of the L-shaped lever 122, such bifurcations being prolonged as indicated by the numeral 123 to provide a fulcruming surface adapted to bear against the differential casing 101 in the manner illustrated best in Fig. 3. The upper portion of this lever has pivoted thereto a link 124 which is connected to a suitable extension 125 extending forwardly from the smaller cages 97 so that pivotal movement imparted by the steering rods to these smaller cages will result in a similar movement being imparted to the L-lever 122 assuring automatically the engagement or disengagement of the relatively substantially and longitudinal clutch faces.

Denoting the right forward wheel and the left rearward wheel by the characters B and C respectively, the operation of the automobile in rounding curves may be previously set forth as follows: Presuming the turn to be made to the left as the automobile proceeds and bearing in mind that the wheels A A are constantly driven, the steering wheel is rotated to the right so that the forward wheels A and B are given a turning movement about their vertical axes to the left while the rearward wheels A and C are simultaneously turned in the opposite direction, all of the wheels thus assuming as has been noted, the position of the wheels of a railway car when rounding a curve on the two rails, the rear wheel being thus adapted to fall in the track made by the forward wheels. The wheels A A being positively and equally driven, the other wheels must adapt themselves to the conditions brought into existence by this leftward turning movement of the machine. In both instances this is automatically accomplished by the clutch and its shifting lever. The wheel B by this turning movement has its clutch maintained in engagement with the clutch face (as is assured preferably by some such expansible resilient means as the coil spring 126 surrounding the arm 120) for although the lever 122 is given what might appear to be a withdrawing movement it should be noted that no fulcrum is provided for this lever when a turn to the left is contemplated such as is necessary for any action of withdrawal upon the arm 120 which remains unchanged in this position. This wheel B is therefore rotated at a speed at least equal to that of the wheels A but it should be particularly noted that such rotation may be (and in a turning movement of the character under discussion is) considerably greater than the driven wheels as the wheel B has a greater distance to travel in the same time, this increased rotation being permitted by the slipping of the clutch 115 over the face 114 in the obvious manner. The rear wheel C however is one of the "pivoting" wheels and proceeds necessarily at a much slower rate in accomplishing the turn and is therefore disengaged from its positively driven wheel by the counterclockwise movement of the lever 122 in Fig. 3 which enables the fulcrum 123 to bear against the differential casing and accordingly withdrawing the arm 120 against the action of the spring 126 disengaging the clutch faces and allowing this rear wheel C to rotate as an idler until the turn is accomplished at which time the clutch faces automatically reëngage, and all four wheels are positively driven on the straightaway.

The operation of the complete mechanism of the novel motor vehicle comprehended by this invention having been thus fully disclosed, it is believed that means have been shown whereby the previously presented objects are capable of being accomplished by this machine so that this invention may be claimed as possessing the advantages and the desirability of such objects. It should be noted however, that no limitations as to the design are contemplated in the present drawings since the assemblage of the various details has been the main point of such illustration, it being believed that various minor changes in the matters of proportion and degree may be resorted to in the combination and arrangement of parts of this embodiment of the automobile without departing from the spirit of this invention as defined in the appended claims.

What is claimed is:—

1. In a self-propelled vehicle, a chassis, wheels pivotally connected to said chassis, means for constantly driving one front wheel and one rear wheel, means for driving all of said wheels on the straightaway, and means permitting the intermittently driven wheels to act as idlers or to rotate faster than said constantly driven wheels.

2. In a self-propelled vehicle, a chassis, wheels pivotally connected to said chassis, a half axle for each wheel alined in pairs, a differential casing for each pair of alined half axles, a driven shaft entering each differential casing, means forming a positive driving connection between said driven shaft and two of said half axles, and clutch means contained in said differential casing permitting the remaining wheels to act as idlers or to rotate at a more rapid rate than said constantly driven wheels.

3. In a self-propelled vehicle, a chassis, wheels pivotally connected to said chassis, a half axle for each wheel, pairs of said axles being axially alined transversely of the machine, a differential casing at the juncture of the alined axles of each pair, a driven shaft longitudinally extending into each casing, positive driving connections between said shaft and one axle of each pair, said positively driven axles being oppositely disposed as regards said chassis, and clutch means operable within said differential casing to permit the non-positively driven wheels to act as idlers or to rotate at a more rapid rate than said positively driven wheels.

4. In a self-propelled vehicle, a chassis, wheels pivotally connected to said chassis, a half axle for each wheel, alined in pairs, a differential casing for each pair of alined half axles, a driven shaft entering each differential casing, means forming a positive driving connection between said driven shaft and two of said half axles, clutch means contained in said differential casing permitting the remaining wheels to act as idlers or to rotate at a more rapid rate than said constantly driven wheels, and means for steering all four of said wheels.

5. In a self-propelled vehicle, a chassis, wheels pivotally connected to said chassis, a half axle for each wheel, pairs of said axles being axially alined transversely of the machine, a differential casing at the juncture of the alined axles of each pair, a driven shaft longitudinally extending into each casing, positive driving connections between said shaft and one axle of each pair, said positively driven axles being oppositely disposed as regards said chassis, clutch means operable within said differential casing to permit the nonpositively driven wheels to act as idlers or to rotate at a more rapid rate than said positively driven wheels, and means for steering all four of said wheels.

6. In a self-propelled vehicle, a chassis, hub cages pivotally connected to said chassis, wheels carried on said hub cages, half axles alined with said hub cages and connected thereto by universal joints, differential casings surrounding abutting ends of pairs of axles, a shaft projecting into each casing, positive driving connections between said shaft, and a pair of oppositely disposed wheels, clutch means regulating the faster or slower driving of the remaining wheels, an oscillatable lever for controlling said clutch, and variable fulcruming means for said lever permitting withdrawal of each clutch only upon a given movement of said wheels.

7. In a self-propelled vehicle, a chassis, hub cages pivotally connected to said chassis, wheels carried on said hub cages, half axles alined with said hub cages and connected thereto by universal joints, differential casings surrounding abutting ends of pairs of axles, a shaft projecting into each casing, positive driving connections between said shaft and a pair of oppositely disposed wheels, clutch means regulating the faster or slower driving of the remaining wheels, an oscillatable lever for controlling said clutch, variable fulcruming means for said lever permitting withdrawal of each clutch only upon a given movement of said wheels, and means for steering each of said wheels and in oppositely directed pairs as set forth.

8. In a self propelled vehicle, a chassis, wheels pivotally connected to said chassis, half axles on each of said wheels, pairs of said axles being alined transversely of the machine, a differential casing joining the adjacent ends of said alined half axles, a driven shaft longitudinally entering both casings, positive driving connections between said driven shaft and a pair of oppositely disposed wheels, variable driving connections between the remainder of said wheels and said shaft, and means for conveying power to said driven shaft.

9. In a self-propelled vehicle, a chassis, forward and rearward wheels, a support for each wheel pivotally connected to said chassis to swing on a vertical axis, a half axle for each of said wheels alined in pairs transversely of the machine, a differential casing sustaining the adjacent ends of each alined pair of half axles longitudinally entering both casings, positive driving connections between said driven shaft and a half axle of each pair of half axles on opposite sides of the vehicle, disengageable driving connections between the remainder of said half axles and said shaft, and means conveying power to said driven shaft.

10. In a self-propelled vehicle, a chassis, wheel supporting frames pivotally connected on vertical axes to said chassis, a wheel carried by each of said frames, half axles alined therewith, pairs of half axles being alined with each other, means for rocking said wheel supporting frames about their vertical axes, a differential casing inclosing and sustaining the meeting ends of alined half axles, a driven shaft having its extremities in each casing, positive driving connections between each end of said shaft and one of a pair of oppositely disposed half axles, disengageable driving connections between each of said half axles and its alined companion half axle, and means for conveying power to said driven shaft.

11. In a self propelled vehicle, a chassis, wheel supporting frames pivotally connected on vertical axes to said chassis, a wheel carried by each of said frames, half axles alined therewith, pairs of half axles being alined with each other, means for rocking said wheel supporting frames about their vertical axes, differential casings connected to said chassis by the wheel supporting pivots and inclosing and sustaining the meeting ends of alined half axles, a driven shaft having its extremeities in said casings, positive driving connections between each end of said shaft and one of a pair of oppositely disposed half axles, disengageable driving connections between each of said half axles and its alined companion half axle, and means for conveying power to said driven shaft.

12. In a self-propelled vehicle, a chassis, wheels pivotally connected to said chassis, means for constantly driving one front wheel and one rear wheel on the opposite side of the vehicle, means for driving all of said wheels on the straight of way, and means permitting the intermittently driven wheels to act as idlers or to rotate faster than said constantly driven wheels.

13. In a self-propelled vehicle, a chassis, wheels pivotally connected to said chassis, means for constantly driving one front wheel and one rear wheel on the opposite side of the vehicle, means for driving all of said wheels on the straight of way, and automatically operating differential mechanisms connected with front and rear axles for permitting the intermittently driven wheels to act as idlers or to rotate faster than said constantly driven wheels.

14. In a self-propelled vehicle, a chassis, wheels pivotally connected to said chassis, a single driving motor mounted on said chassis, means connected with the motor for directly and constantly driving one front wheel and one rear wheel on the opposite side of the vehicle, means for driving all of said wheels on the straight of way, and means permitting the intermittently driven wheels to act as idlers or to rotate faster than said constantly driven wheels.

In testimony whereof I affix my signature in presence of two witnesses.

VIRGIL A. STASER.

Witnesses:
J. C. BLOCKBOER,
JNO. P. SUTTER.

Copies of this patent may be obtained for five cents each, by addressing the "Commissioner of Patents, Washington, D. C."